United States Patent [19]

Popoff et al.

[11] Patent Number: 4,836,923
[45] Date of Patent: Jun. 6, 1989

[54] CARTRIDGE AND COVER ASSEMBLY FOR FLUID FILTERS

[75] Inventors: Peter Popoff; Walter H. Stone; John F. Church, all of Modesto, Calif.

[73] Assignee: Parker Hannifin Corporation, Cleveland, Ohio

[21] Appl. No.: 138,613

[22] Filed: Dec. 23, 1987

[51] Int. Cl.⁴ .................... B01D 27/06; B01D 27/08
[52] U.S. Cl. .................... 210/232; 210/441; 210/444; 210/454; 210/497.01
[58] Field of Search ............... 210/435, 437, 438, 439, 210/441, 444, 455, 416.4, 451, 454, 477, 493.2, 232, 248, 497.01; 55/510, 519, 521, 527

[56] References Cited

U.S. PATENT DOCUMENTS

| | | | |
|---|---|---|---|
| 1,468,906 | 9/1923 | Inman | 210/454 |
| 2,589,920 | 3/1952 | Beckett | 210/451 |
| 2,858,026 | 10/1958 | Lorimar | 210/444 |
| 3,432,005 | 3/1969 | Gates | 184/6 |
| 4,435,287 | 3/1984 | Suminoto | 210/136 |
| 4,561,979 | 12/1985 | Harms et al. | 210/438 |

Primary Examiner—Richard V. Fisher
Assistant Examiner—Matthew O. Savage
Attorney, Agent, or Firm—Ralph E. Jocke

[57] ABSTRACT

A top-loading filter housing has a spin-on combination cartridge and cover in a unitary assembly. The cartridge is an annular filter medium surrounding a perforated center tube and supported in an imperforate bottom endcap, being joined by potting compound to provide a consolidated structure. An annular seal is retained in a central opening in the endcap and is sized for a sliding fit on a vertical standpipe, centrally supported in the filter housing. The cover portion of the cartridge is a molded, circular, glass-filled nylon plate having a depending peripheral flange threadedly receivable in the open, upper end of the filter housing. The cover includes a central well in which the filter medium and centertube are received, both being secured and sealed by potting compound so that the cover and cartridge may be replaced as an assembly.

10 Claims, 2 Drawing Sheets

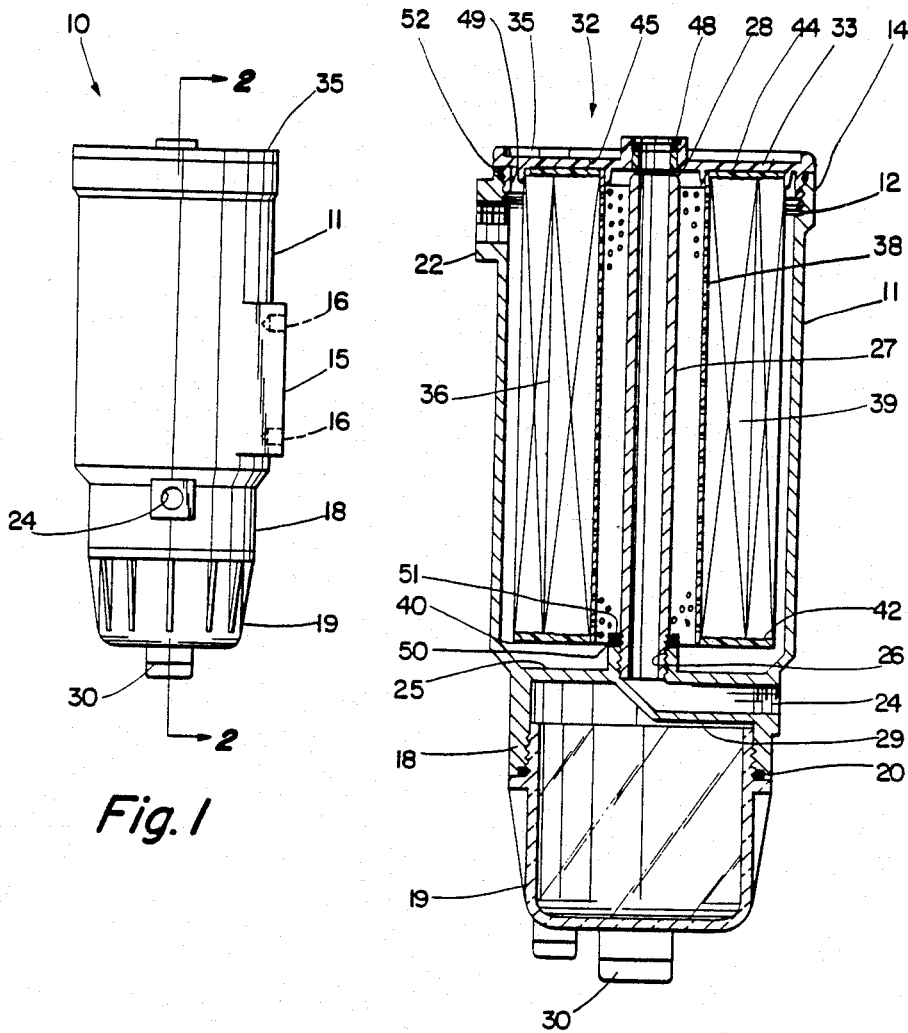

CARTRIDGE AND COVER ASSEMBLY FOR FLUID FILTERS

BACKGROUND OF THE INVENTION

This invention relates to filters generally and more particularly to diesel engine fuel filters of the replaceable cartridge variety.

The cartridge type of replaceable filter element has found wide spread application in providing a particular convenience for interchange of the filter medium. In many instances, the spin on type of filter cartridge is utilized as this provides the additional convenience of simply threading and unthreading the cartridge to accommodate the interchange.

Previous top loading cartridge filter designs have divided the filter housing and the filter element into separable entities usually comprising three parts, namely the disposable filter element, the filter housing and the filter cover assembly. These separate components have enabled manufacturers to offer sturdy, permanent filter housings while minimizing replacement element components and costs.

Spin on filter elements were later developed which were comprised of an inseparable filter housing and element assembly (usually disposable) along with a non-disposable head or cover assembly. Spin on elements initially offered convenience in element change over cartridge elements, but passed increased replacement element costs onto the end user. They were also less convenient than normal in top loading configurations.

Changing the filter element on the typical top loading cartridge filter involves draining the housing below the filter cartridge. The cover assembly and cartridge element are then removed from the housing in two separate operations. This can be time consuming and inconvenient in that the filter element has usually been submersed in the fluid and cannot be extracted by hand without contacting the fluid.

In changing a typical top loading, spin on unit, the element/housing must be completely drained of fluid before unscrewing from the head assembly to avoid spillage. This often involves a significant waiting period for the housing to drain completely. Spin on element replacement is more expensive than similar cartridge element replacement because the element and housing are inseparable and both must be disposed of.

The spin on concept especially in top loading applications, did not vastly improve element change out convenience over cartridge elements, but it did increase replacement elements costs. As a result, there has been a need for a top loading element design which would conveniently spin on and off, while avoiding the multiple operations and mess associated with cartridge element change out. It would also be necessary in such design to avoid the higher cost associated with the spin on type of element replacement.

SUMMARY OF THE INVENTION

A top loading filter with a spin on combination cartridge element/cover assembly, in which an inexpensive cover assembly is disposed of with the filter element at the element change out, provides the advantages outlined above. In this arrangement, the filter housing having an open upper end provides a stationary structure which is typically bolted to a vehicle panel or the like and which is plumbed with inlet and outlet ports to provide a fluid flow path throughout the housing. A central tubular stand pipe is typically employed in such filter housing to provide a part of the flow path whereby fluid is routed outwardly of the housing from an internal location near the top thereof, but different configurations could be employed in this regard as well. Typically, the housing is threaded at its open upper end and is adapted to receive the combination cartridge element/cover assembly.

The cartridge assembly is in the configuration of an annular filter medium of fairly conventional structure consisting of a perforated center tube supporting the filter medium and having a bottom end cap in which the filter medium and center tube are secured by a bed of potting compound to provide a unitary structure. The bottom end cap includes a central opening and an annular seal at that location which is adapted to slide over the periphery of the stand pipe when the cartridge is inserted into the filter housing. A cover is provided at the open upper end of the housing and includes an externally threaded depending flange adapted to engage and close the open end of the housing. An elastomeric seal is provided as well for this purpose. The cover includes a central well therein in which the filter medium and center tube are disposed and retained in place by means of a bed of potting compound so that the filter medium and end cover are an integral unit. Preferably, the cover is formed of glass-filled nylon to provide a relatively strong and yet inexpensive device for support of the filter medium and closure of the end of the housing. A central vent having a threaded plug therein is typically included in the end cover for venting and/or filling purposes. The filter housing is disclosed in both a unitary housing configuration and in one in which a separable collection bowl is included at the lower portion thereof. In both configurations, drain valves may be included for manual or automatic drain of the lower portion of the housing.

It is thus apparent that when element change out occurs, the cover element assembly is unscrewed by hand and removed in one operation. As the cover portion itself is not externally submersed in fluid, this can be done without contacting the fluid. It is also unnecessary to drain the unit as fluid left in the housing is filtered through the new element in refilling it when the assembly is screwed back onto the filter. This avoids wasted and spilled fuel as well as decreasing the drainage time required with prior top loading spin on units.

While the cover of this unit is disposable as well in this type of device, this apparatus is advantageous in that replacement element components and costs are substantially similar to prior art conventional cartridge filter designs. In such prior art designs, it is required that an upper end cap be included on the cartridge element and it is apparent that accommodation must be made for supporting the cartridge within the filter housing, both of which are inherently provided in the instant invention. Further, element change out is much more convenient in this particular design and the likelihood of mismatching filter mediums and the like are even further removed inasmuch as the proper medium is also always associated with the appropriate cover portion thereof.

BRIEF DESCRIPTION OF THE DRAWINGS

FIG. 1 is an elevational view of one embodiment of fuel filter of the invention having a combined cartridge/cover assembly;

FIG. 2 is a vertical cross sectional view of the fuel filter of FIG. 1; and

DETAILED DESCRIPTION OF THE INVENTION

Figure 3:
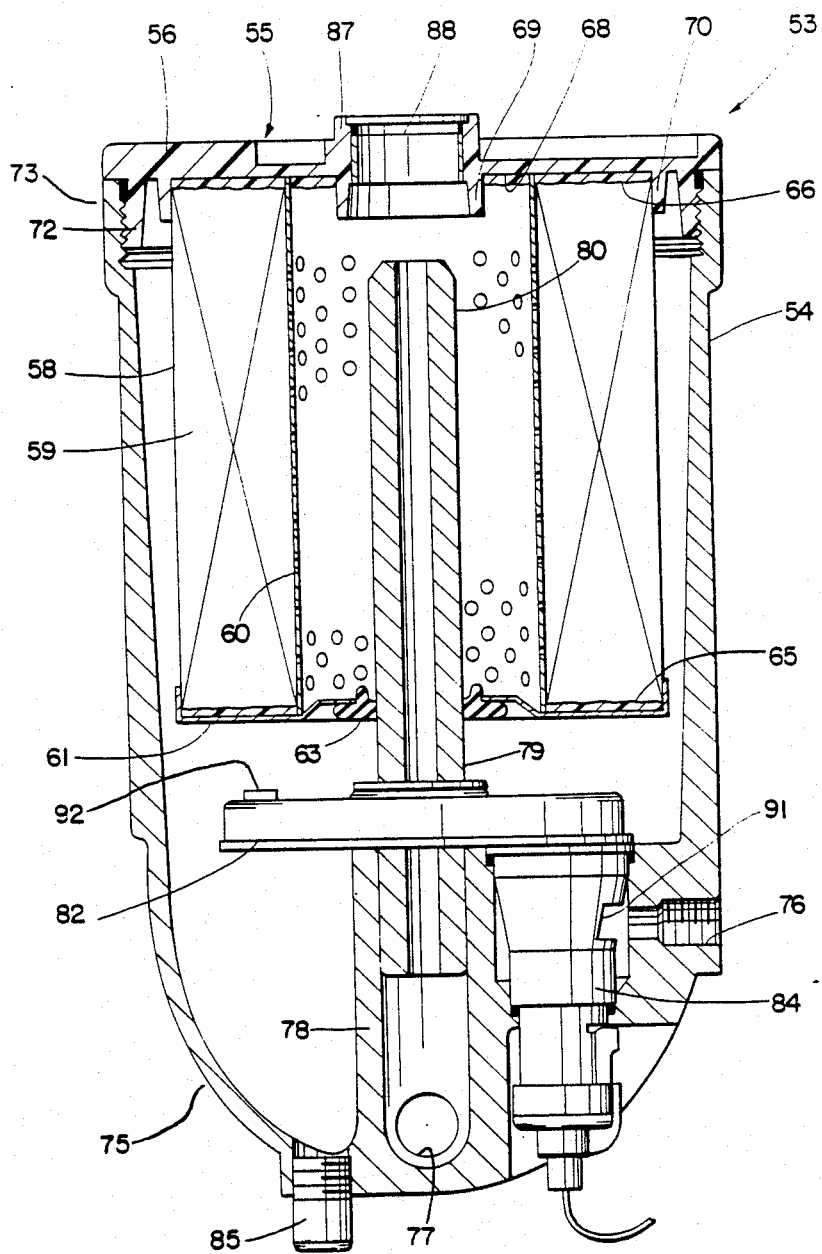
FIG. 3 is a vertical cross sectional view of a second embodiment of fuel filter of the invention having a combination filter element/cover assembly.

Referring now to FIGS. 1 and 2, there is shown a first embodiment of the instant invention consisting of fuel filter 10 having an elongated cylindrical housing 11 with internal threads 12 at its open upper end 14. Housing 11 has a lateral boss 15 thereon at its mid section which in turn includes several threaded openings 16 which are adapted to receive bolts for securement of filter 10 to stationary structure or the like adjacent to a diesel engine or other device which with the filter is associated. Housing 11 includes a generally cylindrical reduced diameter lower end 18, similarly having internal threads thereon and adapted for receipt of a conventional collection bowl 19 for entrapment of contaminants which are separated from the fuel being passed through filter 10. Collection bowl 19 includes external threads at its upper end and an o-ring elastomeric seal 20 for releasably securing the unit in a sealed manner to the lower end 18 of housing 11.

Still further, housing 11 includes threaded inlet port 22 near the upper end and outlet port 24 near the bottom for interconnection of filter 10 to a fluid system and for routing the fluid internally of the filter housing 11. An internal transverse wall 25 separates the reduced diameter lower end 18 of the housing from the upper portion thereof and includes a vertical boss housing central opening 26 therein which is internally threaded and which is adapted to receive center tube 27. Center tube 27 is an elongated tube which extends from transverse wall 25 to an upper free end 28 which is adjacent the open upper end 14 of housing 11. Center tube 27 is vertically oriented in housing 11, being disposed substantially on the central axis thereof. The lower end of center tube 27 is in fluid communication with outlet port 24 being joined by means of a laterally extending conduit formed beneath transverse wall 25 of housing 11. Housing 11 is typically a die cast aluminum housing, machined to form ports 22, 24 and central opening 26 and together with center tube 27 establishes a fluid flow path within housing 11 from inlet port 22 to outlet port 24. As noted, collection bowl 19 may be of relatively conventional configuration comprising a see-through plastic bowl formed of polycarbonate or the like and preferably includes a drain valve 30 at the lower portion thereof. Collection bowl 19 may be threadedly removed from housing 11 to remove contaminants from the interior thereof in addition to draining of the interior by means of drain valve 30.

Fuel filter 10 further includes a combination cover/cartridge assembly 32 to provide a replaceable filter element feature for the filter assembly. The cartridge assembly includes a cover portion 35 and a cartridge portion 36 joined as a unitary assembly and serviceable in filter 10 as an integral unit. Cartridge 36 comprises a conventional perforated center tube 38 around which are disposed one or more layers of filter media 39 in an annular configuration and which may further be covered at the periphery by one or more wraps of paper or the like, the latter extending part way or substantially the full axial length of filter element 39. A plate-like bottom end cap 40 of generally annular configuration is disposed adjacent the lower axial end of the filter media 39 and is secured thereto as well as to center tube 38 by means of a layer of potting compound 42.

At its upper end, filter element 39 is secured to the underside of cover 35 in a similar matter, that is by a layer of potting compound 44 which permanently unites filter media 39 with cover 35. For this purpose cover 35 which is generally between concentric ridges, of circular, plate-like configuration, has a well 33 formed on its underside, in which the filter media 39 and center tube 38 may be positioned prior to pouring of potting compound 44. Cover 45 includes vent 48 formed in a central boss and which is normally closed by means of a threaded plug to serve either for venting of the interior of filter housing 11 or for filling purposes therefor. Cover 35 further includes an externally threaded depending flange 49 at its periphery which is threadedly receivable in the open upper end 14 of housing 11. The bottom end cap 40 of cartridge 36 includes central opening 50 therein in which is disposed an elastomeric annular seal 51, the latter being sized to be a sliding, sealing fit over the periphery of center tube 27 so as to seal the lower end of cartridge 36.

Thus, it will be apparent that cover/cartridge assembly 32 may be unthreaded from housing 11 and removed therefrom by axially withdrawing same, in the process sliding seal 51 towards the free end 28 of center tube 27 and that a replaceable cover/cartridge assembly 32 may similarly be positioned within housing 11 and threadedly engaged therewith in a sealing configuration. Preferably, cover/cartridge assembly 32 retains an o-ring seal 52 at its outer periphery to provide an efficient sealing engagement with housing 11.

It will be apparent also that the cover/cartridge assembly 32 may be placed in or removed from housing 11 without the necessity for physically contacting the fluid contained in housing 11 or even requiring the prior drainage of fluid therefrom. Further, it will be apparent that cartridge 36 will be properly oriented within housing 11 after positioning therein with its lower end in sealing engagement with center tube 27 and placing the periphery of filter media 39 in close-spaced relation to the interior of housing 11 so that an annular peripheral fuel chamber is provided therebetween for receipt of fluid from inlet port 22. After fluid passes through filter media 39 and perforated center tube 38, it will be routed through standpipe 27 to outlet port 24 and outwardly to a remote part of the fluid system.

Referring to FIG. 3, a second embodiment of fuel filter 53 is depicted as comprising housing 54 and combination cover/cartridge assembly 55. In this embodiment of the invention, cover/cartridge assembly 55 includes cover 56 and cartridge 58, the latter including annular filter media 59 similar to that previously described. Cartridge 58 further includes vertical perforated center tube 60 and bottom end cap 61, the latter being a circular plate having a central opening at which is disposed annular elastomeric seal 63. The filter media 59, center tube 60 and bottom end cap 61 are secured as a unitary element by means of deposited potting compound 65. Similarly, cartridge 58 is secured to cover 56 by means of a layer of potting compound 66 disposed in a well 68 on the underside of cover 56, the well 68 being formed between concentric downwardly directly circular flanges 69, 70. This provides a consolidated structure which may be inserted and removed as a unit from filter housing 54. Cover 56 further includes peripheral flange 72 which is externally threaded and which is adapted for threaded interengagement with the open upper end of housing 54 in a manner similar to that previously described with respect to the first embodiment of the invention.

In this embodiment of the invention housing 54 is a unitary structure comprising an elongated cylindrical, thin wall housing having an open, internally threaded upper end 73, a rounded, closed lower end 75 and includes a transverse inlet port 76 and outlet port 77 disposed near the bottom of housing 54. Outlet port 77 communicates with the interior of a vertically upstanding interior boss 78 which has a central, vertically oriented opening adapted to frictionally receive and retain upstanding, central, stand pipe 79. Standpipe 79 is a tubular structure having a lower end disposed in boss 78 and an upward free end 80 in the center of housing 54 and adjacent the open upper end thereof in close spaced relation to cover 56.

In this embodiment of the invention, a heater structure 82 is provided in a pancake configuration having a central opening which is supported on central boss 78 and through which fluid flows from inlet port 76 to the outer periphery of filter medium 59. Interposed between heater element 82 and inlet port 76 is thermostat 84 which serves to monitor the temperature of fluid within housing 54 to control the degree of heat applied by heater element 82. Fluid flows from inlet port 76 to an inlet opening 91 in thermostat 84, through outlet 92 of heater 82, through filter medium 59 and standpipe 79 to outlet port 77. A drain plug 85 is provided in a threaded opening at the bottom of filter housing 54 for draining the interior thereof in a manner similar to that described previously.

Cover 56 is a circular, thin plate like structure having an upstanding boss 87 at the central portion thereof which is threaded to receive a vent plug 88 for venting of the interior of filter housing 54 or for filling purposes therefor Cover 56 is preferably formed of glass filled nylon and may be conveniently formed by an injection molding process or appropriately machined to the configuration desired. Glass filled nylon is preferred as a material because of its relatively high strength and ability to withstand axial and threading force loads and yet be of a relatively low cost so as to be disposable together with the filter cartridge 58 upon replacement thereof. Housing 54 is preferably a die cast aluminum structure which may be appropriately machined to provide the threaded port arrangements and the like.

We claim:

1. Fluid filter apparatus, comprising:
 a generally cylindrical filter housing having an open end,
 port means for routing fluid into and out of said housing,
 a vertical standpipe in said housing in direct fluid communication with one of said port means,
 a filter medium of annular configuration for separating out fluid contaminants disposed in surrounding relation of said standpipe, said filter medium having a first axial end and a second axial end,
 an imperforate end cap secured to said second end of said filter medium, said end cap including a central opening for accepting said standpipe,
 seal means for sealing said end cap and said standpipe, and
 an imperforate disposable cover for closing said open end of said housing, said filter media permanently affixed at said first end to said cover and disposable therewith.

2. Fluid filter apparatus as set forth in claim 1 wherein said cover further comprises means thereon for releasing said cover at said open end of said housing.

3. Fluid filter apparatus as set forth in claim 2 further including seal means supported on said cover and disposable therewith.

4. Fluid filter apparatus, comprising a vertically oriented housing having an open upper end,
 an inlet port and an outlet port in said housing,
 a tubular standpipe supported in said housing in a vertical disposition, said standpipe having a lower end secured in said housing in close association with said outlet port and a free upper end adjacent said open upper end of said housing,
 a filter cartridge removably received in said open upper end of said housing, said cartridge comprising a permanently affixed cover and filter medium combination, said filter medium surrounding said standpipe when installed in said housing,
 a bottom endcap secured to said filter medium, said bottom endcap having a central opening through which said standpipe projects,
 seal means at said central opening for sealing against the periphery of said standpipe, and
 interengaeable threads on said filter cartridge and said housing, whereby said filter cartridge may be rotatably engaged and disengaged with said housing.

5. The filter apparatus as set forth in claim 4 wherein said housing includes a generally cylindrical cavity therein in which said standpipe is generally centrally disposed, said end cap and said filter medium being generally circular, and wherein said interengageable threads are on said cover of said filter cartridge.

6. Fluid filter apparatus as set forth in claim 5 wherein said cover includes a central well on the underside thereof in which the upper end of said filter medium is received, said well being partly filled with potting compound for sealably securing said filter medium therein.

7. Fluid filter apparatus as set forth in claim 6 wherein said cover is formed of glass-filled nylon.

8. Fluid filter apparatus as set forth in claim 6 wherein said housing has a permenently affixed closed bottom end and said outlet port is located in said bottom end, and further including a drain valve in said bottom end.

9. Fluid filter apparatus as set forth in claim 6 wherein said housing further comprises a threaded bottom end, and a contaminant bowl is threadedly engageable at said bottom end.

10. Fluid filter apparatus as set forth in claim 9 wherein said inlet port is disposed adjacent the upper end of said housing and a drain valve is included in said contaminant bowl.

* * * * *